(12) United States Patent
Biberdorf et al.

(10) Patent No.: US 10,920,380 B2
(45) Date of Patent: Feb. 16, 2021

(54) SYSTEM AND METHOD FOR AUTOMATICALLY CONTROLLING COMPACTOR COMPACTION SURFACE CONTACT PRESSURE

(71) Applicant: Caterpillar Paving Products Inc., Brooklyn Park, MN (US)

(72) Inventors: Maria L. Biberdorf, Maple Grove, MN (US); Brian D. Nagel, Ramsey, MN (US); Nicholas A. Oetken, Brooklyn Park, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 16/442,985

(22) Filed: Jun. 17, 2019

(65) Prior Publication Data

US 2020/0392676 A1  Dec. 17, 2020

(51) Int. Cl.
| | |
|---|---|
| E01C 19/00 | (2006.01) |
| E01C 19/26 | (2006.01) |
| B60C 23/04 | (2006.01) |
| E01C 19/27 | (2006.01) |
| E01C 19/23 | (2006.01) |

(52) U.S. Cl.
CPC .......... *E01C 19/26* (2013.01); *B60C 23/0486* (2013.01); *E01C 19/236* (2013.01); *E01C 19/27* (2013.01)

(58) Field of Classification Search
CPC ........ E01C 19/26; E01C 19/27; E01C 19/236; B60C 23/0486

USPC ................................................. 404/117, 132
See application file for complete search history.

(56) References Cited

U.S. PATENT DOCUMENTS

| | | | | |
|---|---|---|---|---|
| 5,629,874 | A * | 5/1997 | Mittal | B60C 23/003 152/415 |
| 6,236,923 | B1 * | 5/2001 | Corcoran | B60C 23/00 340/442 |
| 7,302,837 | B2 * | 12/2007 | Wendte | B60C 23/002 340/442 |
| 8,443,852 | B2 * | 5/2013 | McCaughey | B60S 5/046 141/237 |
| 8,838,347 | B2 | 9/2014 | Norton et al. | |
| 9,139,964 | B2 * | 9/2015 | Ries | F01N 5/02 |
| 10,131,191 | B2 * | 11/2018 | Vervaet | B60C 23/002 |
| 10,465,810 | B2 * | 11/2019 | Ehrlich | F16K 17/048 |
| 2014/0079484 | A1 * | 3/2014 | Ries | G01G 19/10 404/130 |
| 2019/0161921 | A1 * | 5/2019 | Schwarting | E01C 19/27 |

* cited by examiner

*Primary Examiner* — Raymond W Addie

(74) *Attorney, Agent, or Firm* — Oblon, McClelland, Maier & Neustadt

(57) ABSTRACT

A system and a method for controlling tire air pressure of a compactor having a plurality of tires. A weight distribution of the compactor is determined according to a per-tire basis. Target air pressures for each of the tires are determined in order to achieve a consistent compaction surface contact pressure across all of the tires or a set of the tires. Air pressure of the tires is controlled to achieve the target air pressures to make the compaction surface contact pressure consistent across all of the tires or the set of the tires.

18 Claims, 4 Drawing Sheets

SYSTEM AND METHOD FOR AUTOMATICALLY CONTROLLING COMPACTOR COMPACTION SURFACE CONTACT PRESSURE

TECHNICAL FIELD

The present disclosure relates to compaction surface contact pressure control systems and methods, and more particularly to systems and methods for automatic compaction surface contact pressure control for pneumatic compactor machines.

BACKGROUND

Compactor machines, also known as compactors and compaction machines, are frequently employed to compact dirt, gravel, asphalt and other compactable surfaces associated with roadbed and other land areas. As used herein, such surfaces may be called compaction surfaces.

One type of compaction machine is a pneumatic wheel roller-style compactor. Such pneumatic compactors generate compaction by applying contact pressure from tires to the compaction surface. Compaction contact pressure of the tires can vary based on applied load and tire pressure. On a multi-tire compactor, both the compactor mass at each tire and individual tire pressures can vary. This can result in uneven ground contact pressure and thus uneven compaction effort.

U.S. Pat. No. 8,838,347 ("the '347 patent") describes an automatic ground contact pressure adjusting system for a pneumatic compactor. According to the '347 patent, a controller may determine a common target tire inflation pressure for all of the tires according to overall machine weight, number of tires of the machine, ground contact area of the tires, and ambient temperature. The '347 patent may not recite either accounting for uneven weight distribution across the machine or assigning different target tire air pressures to different tires to achieve a consistent compaction surface contact pressure across all tires or a set of tires regardless of weight distribution.

SUMMARY OF THE DISCLOSURE

In one aspect of the present disclosure, a system for controlling tire air pressure of a compactor having a plurality of tires can be provided or implemented. The system can comprise: a memory configured to store data correlating tire air pressure, compaction characteristics including weight of the compactor at each of the tires, and compaction surface contact pressure; and circuitry. The circuitry can be configured to determine a real-time weight distribution of the compactor according to a per-tire basis, determine respective target air pressures for the tires, based on the determined real-time weight distribution and the data stored in the memory, to achieve a consistent compaction surface contact pressure across all of the tires, and control air pressure of the tires to achieve the determined respective target air pressures.

In another aspect of the present disclosure, a method of controlling ground contact pressure of a compactor having a plurality of tires can be provided or implemented. The method can comprise determining, using a processor, an uneven weight distribution of the compactor; determining, using the processor, at least one target air pressure to change compaction surface contact pressure of at least one of the tires to achieve a consistent compaction surface contact pressure across a set of tires of the plurality of tires; and changing, using the processor, the compaction surface contact pressure of said at least one of the tires to achieve the consistent compaction surface contact pressure across the set of tires by controlling air pressure to said at least one of the tires to said at least one target air pressure.

In yet another aspect, the present disclosure can provide or implement a multi-tire compactor machine. The multi-tire compactor machine can comprise: a plurality of pneumatic tires, including front pneumatic tires and rear pneumatic tires; a plurality of sensors configured to sense weight of the compactor machine in association with each of the pneumatic tires; a compressor and ventilation assembly operatively coupled to the pneumatic tires to adjust air pressure of the pneumatic tires; a memory; and a processor operatively coupled to the memory. The processor can be configured to receive signals from the sensors corresponding to weight of the compactor machine in association with each of the pneumatic tires, determine a weight distribution of the compactor machine according to a per-pneumatic tire basis from the received signals from the sensors, determine respective target air pressures for the pneumatic tires, based on the determined weight distribution, to achieve a consistent compaction surface contact pressure across all of the pneumatic tires, and control the compressor and ventilation assembly to adjust the air pressure of the pneumatic tires to achieve the determined respective target air pressures.

Other features and aspects of this disclosure will be apparent from the following description and the accompanying drawings.

DETAILED DESCRIPTION

The present disclosure relates to compaction surface contact pressure control systems and methods, and more particularly to systems and methods for automatic compaction surface contact pressure control for pneumatic compactor machines.

Figure 1:
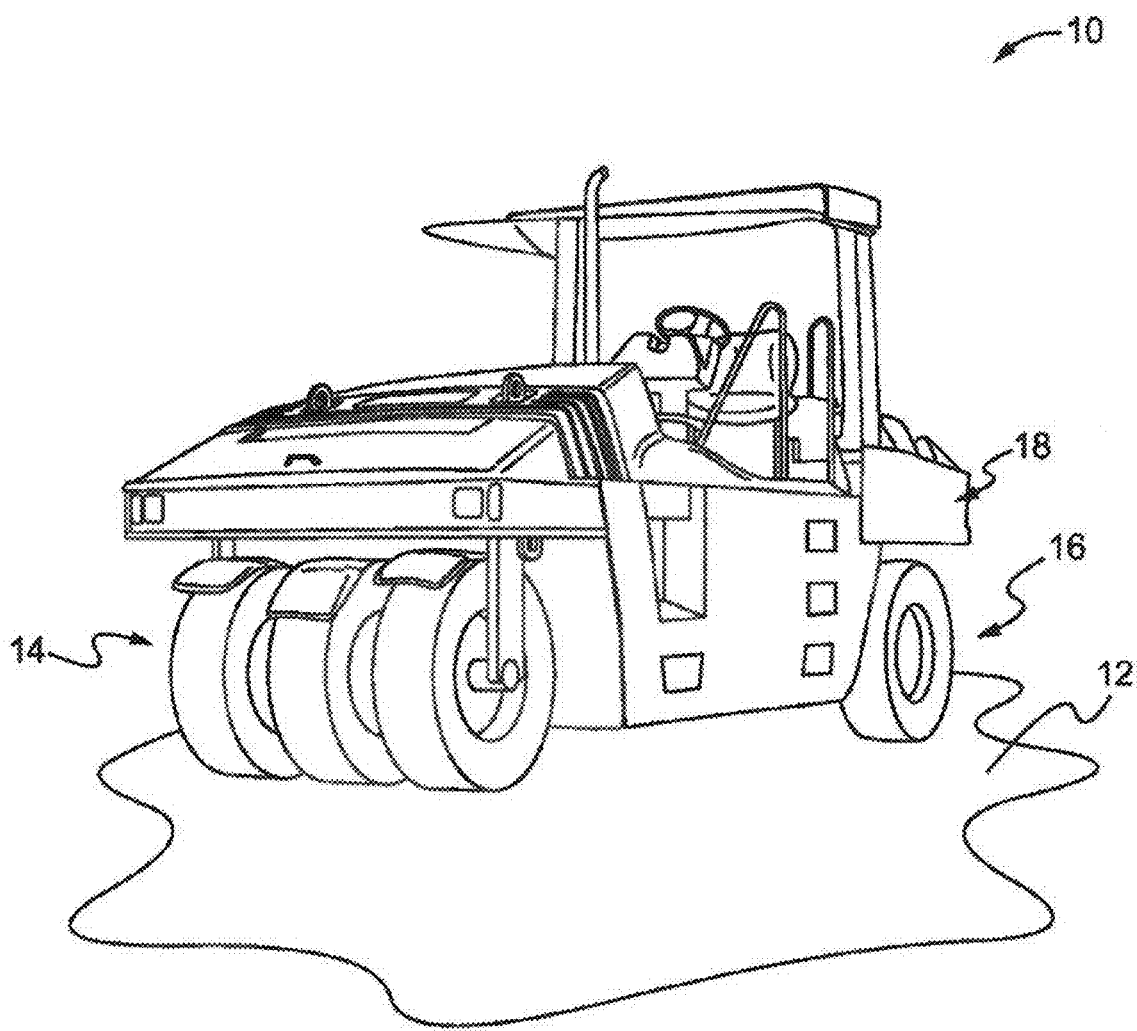
FIG. 1 is a perspective view of a pneumatic compactor machine according to one or more embodiments of the disclosed subject matter.

Referring to FIG. 1, a pneumatic compactor machine 10 may be useful for compacting and/or increasing density of a compaction surface 12, such as dirt, gravel, and/or bituminous mixtures. The machine 10 may have a set of front compacting wheels containing pneumatically inflated tires 14 and a set of rear compacting wheels also containing pneumatically inflated tires 16, both front and rear sets of tires 14, 16 being rotatably mounted on a main frame 18 of the machine 10. Though machine 10 is shown as including a plurality of tires for the front set of tires 14, embodiments of the disclosed subject matter are not limited to the number of tires shown. For example, the front set of tires 14 may include only one tire, only two tires, or more than three tires. The foregoing is equally applicable to the rear set of tires 16. Moreover, the front set of tires 14 may be different in number or the same in number as the rear set of tires 16.

Additionally, the plurality of tires of each of the respective front and rear sets, 14 and 16, may be structurally and operatively equivalent, or in some instances, the size and structure of the front and rear tires may deviate from each other.

It will be appreciated that performance of a pneumatic compactor machine, such as machine 10, can vary as a function of at least tire inflation pressure and the softness or hardness of the surface being compacted. For example, low tire inflation pressures may generally improve traction and durability of the compactor machine on softer ground, for example, while higher tire inflation pressures may provide more efficient results on firmer surfaces. To the extent that the compaction surface may be softer and of lower density in early stages of the compaction process, the surface will generally become increasingly denser and hence more firm after several passes of the compactor machine over the surface. As such, it may be advantageous to vary the tire inflation pressure as a function of real-time density of the compaction surface.

The main frame 18 may also support a ballast or a ballast tank (not shown) for providing additional weight to the machine 10 in accordance with and/or to meet surface compaction demands. Such ballast may be filled with sand or water, or other substances including liquid antifreeze solutions during cold winter operation. Optionally, one or more of such ballasts for providing weight may be provided on or to the machine 10 according to an asymmetrical configuration. For instance, ballasts provided in association with the front of the machine 10 may create more weight at the front of the machine 10 than ballasts provided in association with the rear of the machine 10 (including no ballasts) or vice versa. Additionally or optionally, ballasts provided in association with the left side of the machine 10 may create more weight at the left side of the machine 10 than ballasts provided in association with the right side of the machine 10 (including no ballasts) or vice versa.

Figure 2:
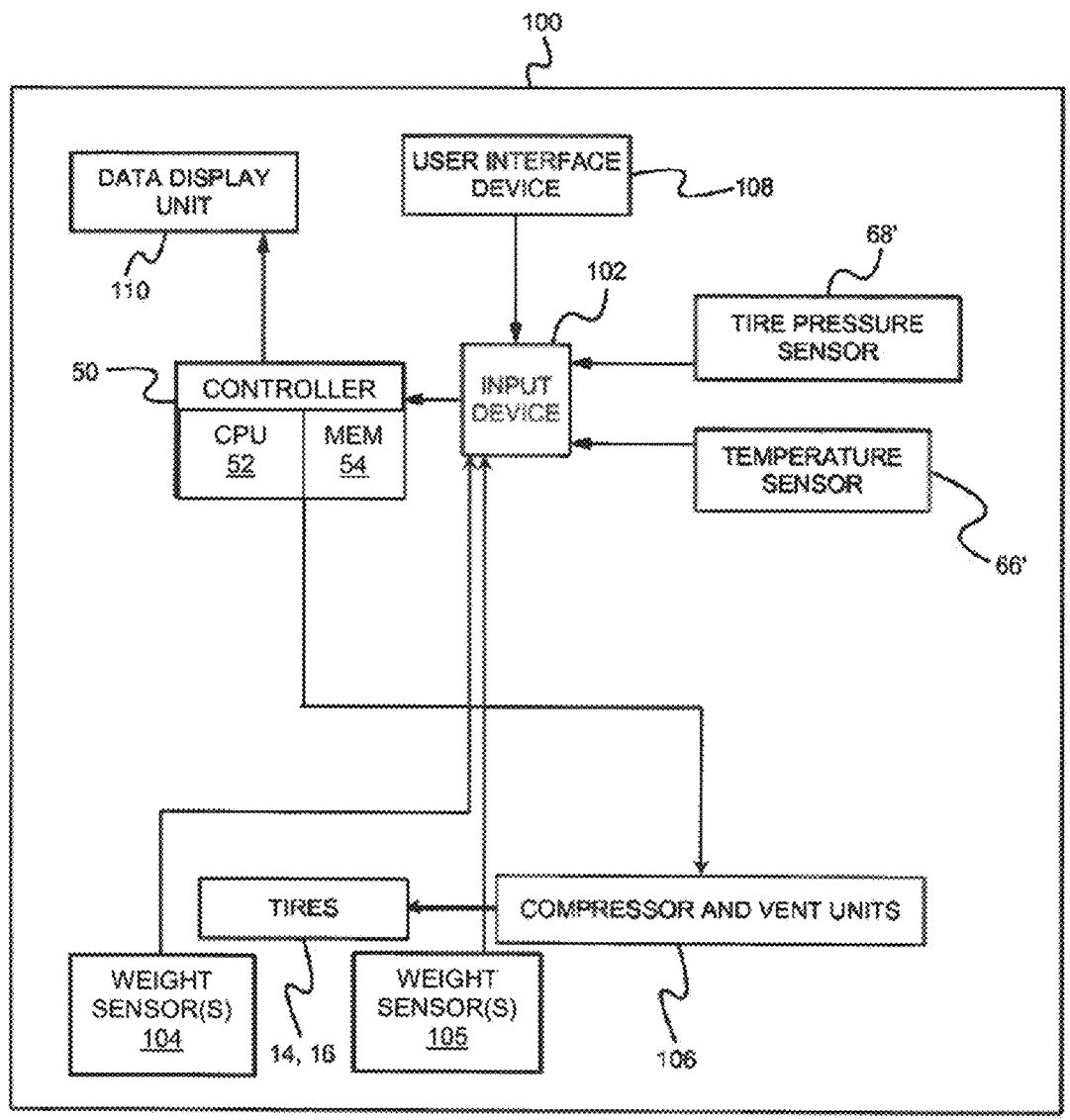
FIG. 2 is a schematic depiction of a system according to one or more embodiments of the disclosed subject matter.

FIG. 2 is a schematic depiction of a system 100 according to one or more embodiments of the disclosed subject matter. The system 100 can be comprised of a controller 50, an input device 102, one or more first or front weight sensors 104, one or more second or rear weight sensors 105, and a compressor and ventilation assembly 106. As shown in FIG. 2, the input device 102 can provide an input to the controller 50; the one or more front weight sensors 104 and one or more rear weight sensors 105 can provide inputs to the input device 102; the controller 50 can provide an input to the compressor and ventilation assembly 106; and the compressor and ventilation assembly 106 can provide inputs to the tires 14, 16. Optionally, the input device 102 may be part of the controller 50 or vice versa.

The system 100 may also be comprised of one or more temperature sensors 66', one or more tire pressure sensors 68', a user interface 108, and a data display device 110. The one or more temperature sensors 66', the one or more tire pressure sensors 68', and the user interface device 108 can provide inputs to the input device 102. The controller 50 can provide an input to the data display device 110.

The user interface 108 may be adapted to enable an operator of the machine 10 to set various settings and/or parameters of the machine 10, such as type of machine, total number of tires, total number of front tires 14, total number of rear tires 16, type of compaction surface, type(s) of tires, total machine weight, ballast weight, etc. The user interface 108 may also allow the operator to override any outputs of the controller 50 if and/or as may be deemed appropriate.

The data display device 110 may be provided inside a cab or operator area of the machine 10. Such data display device 110 may provide to an operator of the machine 10 various pieces of information, including settings, parameters, and operating characteristics of the machine 10, such as a determined weight distribution of the machine 10. Further, some or all of the data can be provided on the data display device 110 in real time. Non-limiting examples of the data display device 110 include one or more monitors, one or more computer displays, etc. Optionally, the user interface 108 may be part of the data display device 110, for instance, in the form of a graphical user interface (GUI) on the data display device 110.

The one or more temperature sensors 66' can detect or determine an ambient temperature associated with the machine 10, such as adjacent to the compaction surface 12. Optionally, the temperature sensor 66' may be provided in association with each tire of the sets of tires 14, 16. Temperature signals from the one or more temperature sensors 66' can be provided to the input device 102. Such temperature signals, or processed variations thereof, can be further provided from the input device 102 to the controller 50.

The one or more tire pressure sensors 68' can detect or determine tire pressure of each tire. According to one or more embodiments, each tire of the sets of tires 14, 16 may have associated therewith respective tire pressure sensors 68'. Tire pressure signals from the one or more tire pressure sensors 68' can be provided to the input device 102. Such tire pressure signals, or processed variations thereof, can be further provided from the input device 102 to the controller 50.

Each of the one or more front weight sensors 104 and the one or more rear weight sensors 105 can detect or determine a corresponding weight of the machine 10. According to one or more embodiments, the weight sensors 104, 105 may be provided on the machine 10 so as to sense weight of the machine 10 in association with individual tires of the sets of tires 14, 16. That is, one or more weight sensors may be provided at, in, on, or in association with a first one of the tires (e.g., right front tire) so as to sense a portion of the weight or load of the machine 10 attributed to or at that tire; one or more weight sensors may be provided at, in, on, or in association with a second one of the tires (e.g., left front tire) so as to sense a portion of the weight or load of the machine 10 attributed to or at that tire; one or more weight sensors may be provided at, in, on, or in association with a third one of the tires (e.g., right rear tire) so as to sense a portion of the weight or load of the machine 10 attributed to or at that tire; and so on for the remaining tires.

As a non-limiting example, the weight sensors 104, 105 may be or include pressure sensors, for instance, on the hydraulic suspension cylinders that support the tires (and wheels). Weight signals (e.g., pressure signals) from the one or more weight sensors 104, 105 can be provided to the input device 102, which can provide the signals, or processed variations thereof, to the controller 50. Alternatively, the weight signals can be provided directly to the controller 50.

The input device 102 may be adapted to receive various input signals including, as noted above, weight-related signals (e.g., pressure signals) from the weight sensors 104, 105. Optionally, the input device 102 can receive input signals from the temperature sensor(s) 66', the pressure sensor(s) 68', and/or the user interface device 108.

The controller 50 can include a processor or processing circuitry 52 and memory 54. Though memory 54 is illustrated as a separate component from processor 52, the memory 54 may be part of the processor 52 (entirely or in part) or a separate memory device. The memory 54 can store data corresponding to tire air inflation pressures, weights or loads associated with each particular tire (e.g., at each tire), and compaction surface contact pressures. The data may also include type(s) of tire, which may include width and/or ground contact area of the types of tire. The data can also include a total number tires of the machine 10, type(s) of compaction surface, and/or ambient temperatures. Number and types of tires of the machine 10 may be considered to be a particular configuration of the machine 10.

Figure 3:
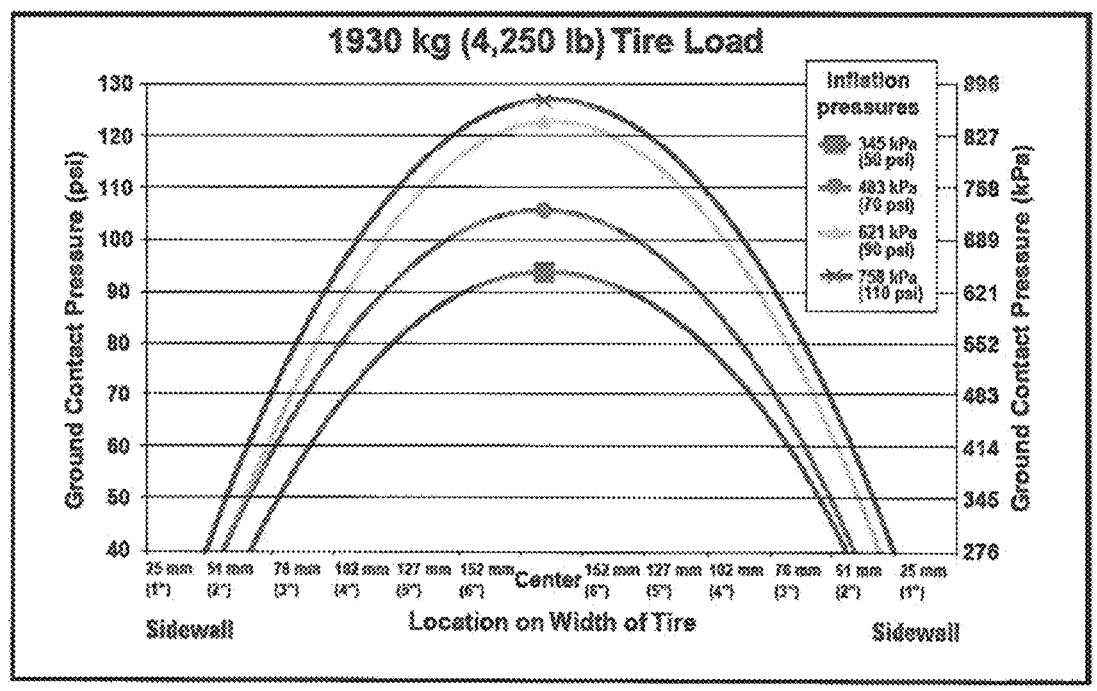
FIG. 3 is a graph correlating various tire and compaction surface characteristics.

Some or all of the data may be stored in the memory 54 so as to correlate or be able to correlate tire air pressure, compaction characteristics including weight of the compactor associated with each tire (e.g., at each tire), and compaction surface contact pressure. Optionally, the data may be stored in a lookup table. FIG. 3, for instance, shows a non-limiting example of a graph representative of data correlated in the memory 54. Notably, ground contact pressure can be correlated to tire load or weight, inflation pressure, and location on the tire.

The controller 50 can, based on the signals from the weight sensors 104, 105, determine weight of the machine 10 at or associated with each of the tires of the sets of tires 14, 16. As one non-limiting example, the controller 50, for instance, the processor 52 thereof, can determine weight of the machine 10 associated with each of the tires using a lookup table. As an example, the lookup table can indicate that pressure associated with an assembly of the tire (e.g., on a corresponding hydraulic suspension cylinder) correlates with a configuration of the machine 10 and a corresponding weight. Such determining weight can be performed periodically or continuously to identify variations in weight of portions of the machine 10.

The controller 50 can determine a weight distribution of the machine 10 based on the determined weight associated with each of the tires of the sets of tires 14, 16. Depending upon the determined weights, such weight distribution may be a weight imbalance between one or more of the tires. For instance, weight imbalance may involve a difference in weight of the machine 10 associated with the front tires 14 as compared to weight of the machine 10 associated with the rear tires 16. Additionally or alternatively, weight imbalance may involve a difference in weight of the machine 10 associated with the right tires as compared to weight of the machine 10 associated with the left tires. Other weight imbalances may also be identified, such as weight differences between individual tires.

The compressor and ventilation assembly 106 may be operatively coupled to the tires to independently adjust the air pressure of the tires of the sets of tires 14, 16. The compressor and ventilation assembly 106 can increase or decrease the air pressure of the tires of the sets of tires 14, 16. Further, the compressor and ventilation assembly 106 can independently adjust the air pressure of the tires of the sets of tires 14, 16 based on control signals from the controller 50. When a desired air pressure is reached, the compressor and ventilation assembly 106 can be controlled by the controller 50 to maintain such desired air pressure.

INDUSTRIAL APPLICABILITY

In general, the present disclosure involves creating consistent ground contact pressure among all tires or subsets of tires of a pneumatic compactor machine, such as machine 10. Such creating can involve achieving and/or maintaining consistent ground contact pressure. Generally, creating consistent ground contact pressure can be performed by individually controlling air pressure of the tires based on determined weight of the machine 10 associated with each of the tires, for instance, an inconsistent weight distribution or imbalance between all tires or subsets of tires. Thus, embodiments of the disclosed subject matter can achieve consistent compaction regardless of weight distribution of the machine 10.

Figure 4:
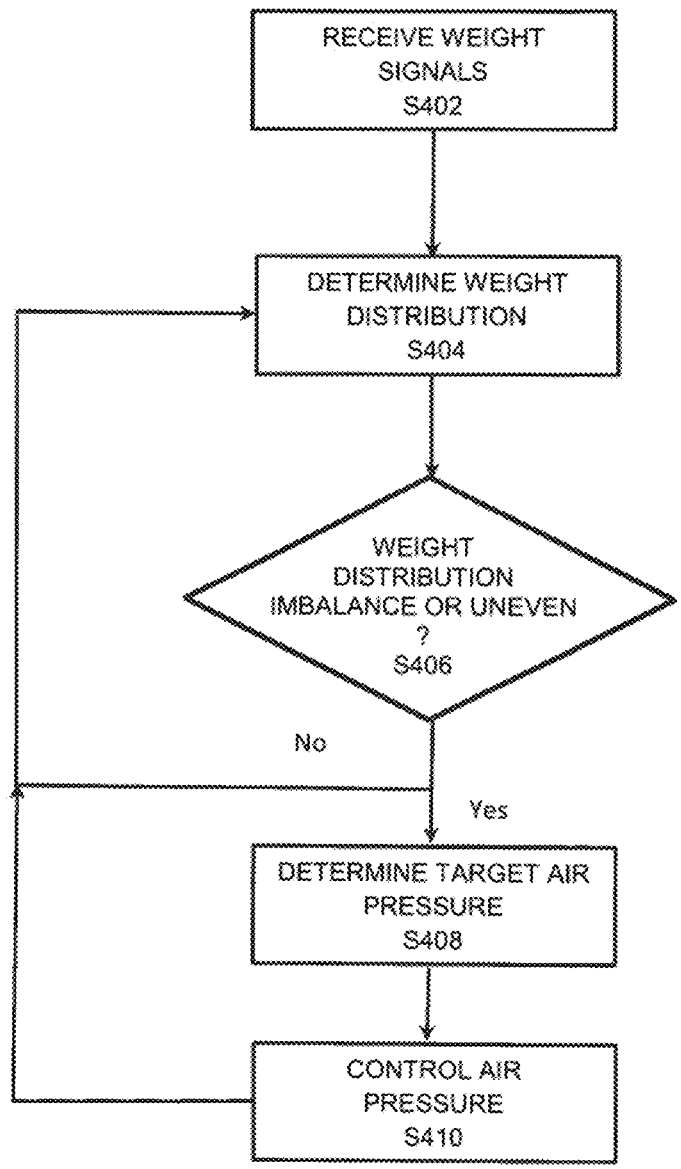
FIG. 4 is a block diagram showing operations according to systems and/or methods of one or more embodiments of the disclosed subject matter.

FIG. 4 is a block diagram showing operations according to systems and/or methods of one or more embodiments of the disclosed subject matter. The operations shown in FIG. 4 may be performed by controller 50, particularly processor 52, using data stored in memory 54 and received from sensors, such as front weight sensors 104 and rear weight sensors 105, from the input device 102 or directly.

At S402, weight signals from the front weight sensors 104 and the rear weight sensors 105 can be provided to the controller 50 either directly or indirectly. As noted above, each of the signals may directly represent weight of the machine 10 associated with a corresponding one of the front tires 14 or an associated one of the rear tires 16, or the controller 50 may use each received signal to calculate or determine the weight of the machine 10 associated with the corresponding tire. As an example, the controller 50 may use a lookup table, such as described above, that correlates pressure with weight.

At S404, a determination of a weight distribution of the machine 10 can be made on a per-tire basis. That is, the weight distribution of the machine 10 can be representative of the weight or weights of the machine 10 at or associated with each of the front tires 14 and each of the rear tires 16 individually. And the controller 50 can make the weight distribution determination based on the weight associated with each of the front tires 14 and each of the rear tires 16 individually or in sets. Moreover, the controller 50 can make the weight distribution determination in real-time, and such weight distribution determination can be performed at startup of the machine 10 and/or continuously or periodically during operation of the machine 10.

S406 can involve determining whether the weight distribution constitutes a weight imbalance or uneven weight distribution of the machine 10 indicating that a weight associated with one or more of the tires is different from a weight associated with one or more other tires. For instance, the weight imbalance may be determined to be between the weight of the front tires 14 and weight of the rear tires 16. Additionally or alternatively, the weight imbalance may be determined to be between the weight of the left tires and the weight of the right tires. Additionally or alternatively, the weight difference may be with respect to the tires individually. Thus, S406 can involve determining one or more weight imbalances, such as between fore and aft (i.e., front tires 14 and rear tires 16) of the machine 10 and between sides (i.e., left side tires and right side tires) of the machine 10.

If no weight distribution imbalance is determined (or a weight distribution imbalance is within a predetermined threshold), control can return to S404. However, if a weight imbalance is determined (including a weight distribution imbalance that is above the predetermined threshold), then control can proceed to S408.

At S408, respective target air pressures for the tires can be determined, for instance, using the controller 50. Such target air pressures can, when set for the tires, achieve a consistent compaction surface contact pressure across all of the tires or sets of the tires (e.g., the front tires 14 or the rear tires 16). The target air pressures are determined so as to control compaction surface contact pressure of the tires. As noted above, the target air pressures can be set or determined based on the weight associated with the tire, as correlated in a lookup table, for instance. In that the compaction surface contact pressure can be correlated to the tire air pressure, the compaction surface contact pressure can thus be controlled based on weight and tire air pressure to be consistent for all of the tires or sets of the tires.

The target air pressures can be determined based on the weight distribution of the machine 10 associated with the tires. As discussed above, the air pressures can be calculated by the controller 50 using a lookup table of data stored in memory 54. Optionally, one or more of the target air pressures can be further determined based on a total number of tires of the machine 10, a ground contact area of the tires, a type of the compaction surface, and/or an ambient temperature of the machine 10. Such data may be provided by memory 54, from the user interface device 108, and/or from various sensors, such as temperature sensor(s) 66'.

Some or all of the determined target tire pressures can be the same, depending upon the determined weight of each of the tires and other compaction characteristics. Moreover, some or all of the target tire pressures can be different, again depending upon the determined weight of each of the tires and other compaction characteristics. For example, a first target air pressure may be the same for the front tires 14, and a second target air pressure may be the same for the rear tires 16. Thus, different target tire air pressures can be assigned to different tires to achieve a consistent compaction surface contact pressure across all tires regardless of weight distribution.

At S410, air pressure of the front tires 14 and the rear tires 16 can be controlled according to the target air pressures. Controlling tire air pressure in this context can mean maintaining or adjusting (i.e., increasing or decreasing) the air pressure, depending upon whether the current air pressure of the tire matches (including within a predetermined range from the target air pressure) or does not match the target air pressure.

The controller 50 may provide control signals to the compressor and ventilation assembly 106 to control tire air pressure at each of the tires individually. In one or more embodiments, the compressor and ventilation assembly 106 can adjust the air pressure of one or more tires until the respective target tire air pressures are achieved (including within a predetermined range from the target air pressure). Thus, according to embodiments of the disclosed subject matter, one, some, or all of the air pressure of the tires can be changed, depending upon whether a variation exists relative to the target tire air pressures, to provide for consistent compaction surface contact pressure for all of the tires or one or more sets of the tires.

Control may proceed back to S404 to repeat operations S404-S410, for instance, to capture a situation where machine or work conditions have changed.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A multi-tire compactor machine comprising:
a plurality of pneumatic tires, including front pneumatic tires and rear pneumatic tires;
a plurality of sensors configured to sense weight of the compactor machine in association with each of the pneumatic tires;
a compressor and ventilation assembly operatively coupled to the pneumatic tires to adjust air pressure of the pneumatic tires;
a memory; and
a processor operatively coupled to the memory and configured to:
receive signals from the sensors corresponding to weight of the compactor machine in association with each of the pneumatic tires,
determine a weight distribution of the compactor machine according to a per-pneumatic tire basis from the received signals from the sensors, the determined per-tire weight distribution indicating a weight imbalance between the weight of the compactor machine associated with at least one of the pneumatic tires and the weight of the compactor machine associated with at least one other of the pneumatic tires,
determine respective target air pressures for the pneumatic tires, based on the determined per-tire weight distribution, to achieve a consistent compaction surface contact pressure across all of the pneumatic tires, and
control the compressor and ventilation assembly to adjust the air pressure of the pneumatic tires to achieve the determined respective target air pressures.

2. The compactor machine according to claim 1, wherein the determined per-tire weight distribution of the compactor machine indicates the weight imbalance between the weight of the compactor machine associated with the front pneumatic tires and the weight of the compactor machine associated with the rear pneumatic tires.

3. The compactor machine according to claim 1, wherein the determined per-tire weight distribution of the compactor machine indicates the weight imbalance between the weight of the compactor machine associated with right side pneumatic tires of the plurality of pneumatic tires and the weight of the compactor machine associated with left side pneumatic tires of the plurality of pneumatic tires.

4. The compactor machine according to claim 1, wherein at least one of the determined target air pressures is different from at least another one of the determined target air pressures.

5. The compactor machine according to claim 1, wherein at least two of the determined target air pressures are the same.

6. The compactor machine according to claim 1, wherein the processor controls the compressor and ventilation assembly to adjust the air pressure of corresponding ones of the pneumatic tires when a determined current air pressure of the pneumatic tire is different from the determined target air pressure for the pneumatic tire.

7. The compactor machine according to claim 1, wherein each said target air pressure to achieve the consistent compacting surface contact pressure across all of the pneumatic tires is determined further based on a total number of pneumatic tires of the compactor machine, a ground contact area of the pneumatic tires, a type of the compaction surface, and/or an ambient temperature of the compactor machine.

8. A system for controlling tire air pressure of a compactor having a plurality of tires, the system comprising:
a memory configured to store data correlating tire air pressure, compaction characteristics including weight of the compactor at each of the tires, and compaction surface contact pressure; and
circuitry configured to:

determine a real-time weight distribution of the compactor according to a per-tire basis, the determined per-tire weight distribution indicating a weight imbalance between the weight of the compactor associated with at least one of the tires and the weight of the compactor associated with at least one other of the tires, determine respective target air pressures for the tires, based on the determined real-time per-tire weight distribution and the data stored in the memory, to achieve a consistent compaction surface contact pressure across all of the tires, and control air pressure of the tires to achieve the determined respective target air pressures.

9. The system according to claim 8, wherein the determined real-time per-tire weight distribution of the compactor indicates as the weight imbalance a first weight imbalance between the weight of the compactor at the front tires and the weight of the compactor at the rear tires and/or a second weight imbalance between the weight of the compactor at right side tires of the plurality of tires and the weight of the compactor at left side tires of the plurality of tires.

10. The system according to claim 8, wherein at least one of the determined target air pressures is different from at least another one of the determined target air pressures.

11. The system according to claim 8, wherein at least two of the determined target air pressures are the same.

12. The system according to claim 8, wherein, for each of the tires, the air pressure is controlled so as to be increased or decreased when a determined current air pressure of the tire is different from the determined target air pressure for the tire.

13. The system according to claim 8, wherein each said target air pressure to achieve the consistent compacting surface contact pressure across all of the tires is determined further based on a total number of tires of the compactor, a ground contact area of the tires, a type of the compaction surface, and/or an ambient temperature of the compactor.

14. A method of controlling ground contact pressure of a compactor having a plurality of tires, the method comprising:

determining, using a processor, an uneven weight distribution of the compactor on a per-tire basis between the weight of the compactor associated with at least one of the tires and the weight of the compactor associated with at least one other of the tires;

determining, using the processor, at least one target air pressure to change compaction surface contact pressure of one or more of the tires to achieve a consistent compaction surface contact pressure across a set of tires of the plurality of tires; and changing, using the processor, the compaction surface contact pressure of said one or more of the tires to achieve the consistent compaction surface contact pressure across the set of tires by controlling air pressure to said at least one of the tires to said at least one target air pressure.

15. The method according to claim 14 wherein the set of tires is all of the plurality of tires.

16. The method according to claim 14, wherein the set of tires is either only a front set of the plurality of tires or only a rear set of the plurality of tires.

17. The method according to claim 14, wherein the set of tires is only either a left side set of the plurality of tires or a right side set of the plurality of tires.

18. The method according to claim 14, further comprising:

determining a second uneven weight distribution of the compactor on the per-tire basis different from said uneven weight distribution; and repeating said determining the at least one target air pressure and said changing the compaction surface contact pressure responsive to said determining the second uneven weight distribution of the compactor.

* * * * *